June 17, 1924.                                                           1,498,474
                                    J. E. MOORE
                              GASOLINE TANK FILLER
                              Filed Jan. 5, 1921                2 Sheets-Sheet 1
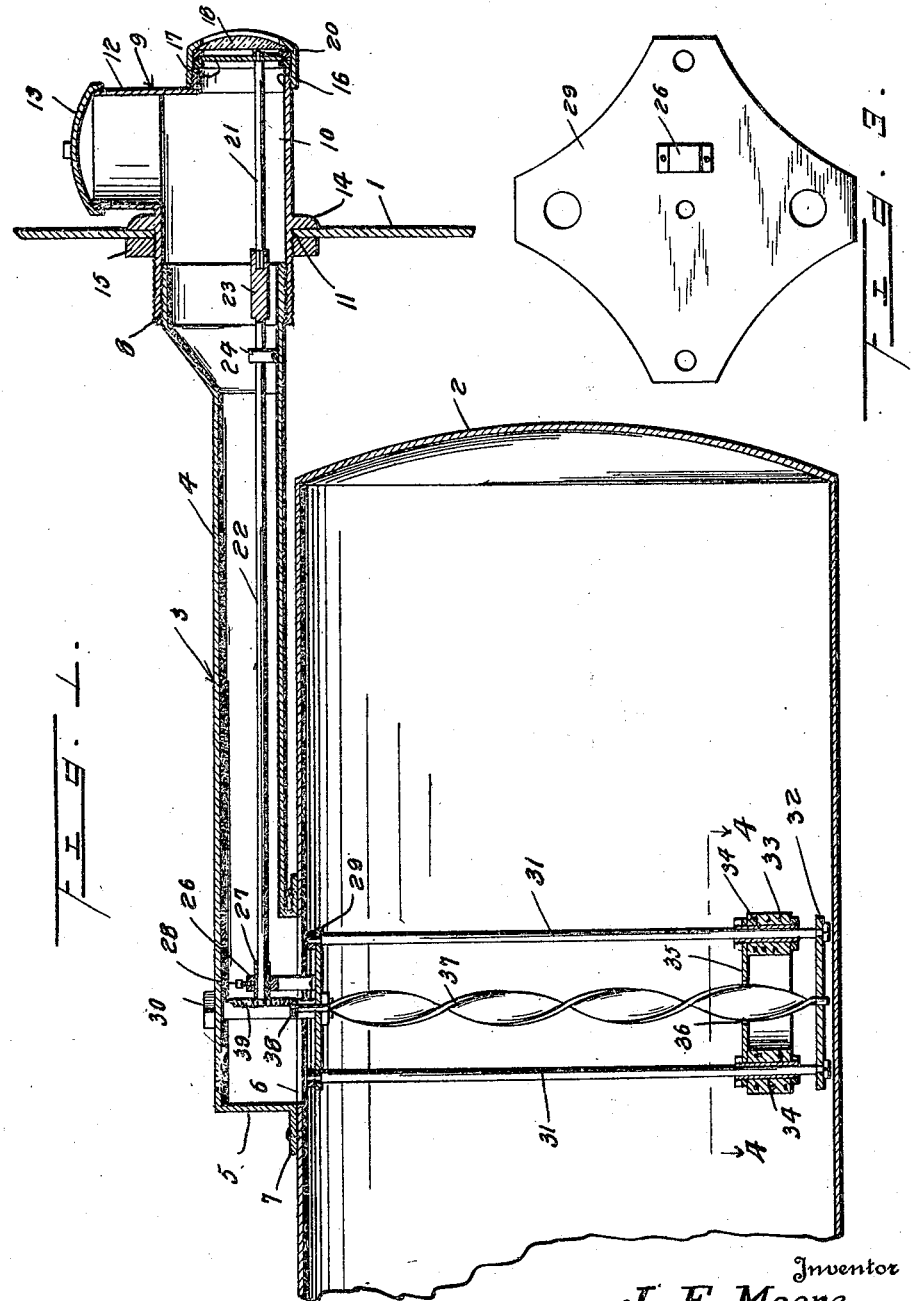
Inventor
J. E. Moore.

June 17, 1924.                J. E. MOORE                1,498,474
                          GASOLINE TANK FILLER
                          Filed Jan. 5 1921         2 Sheets-Sheet 2
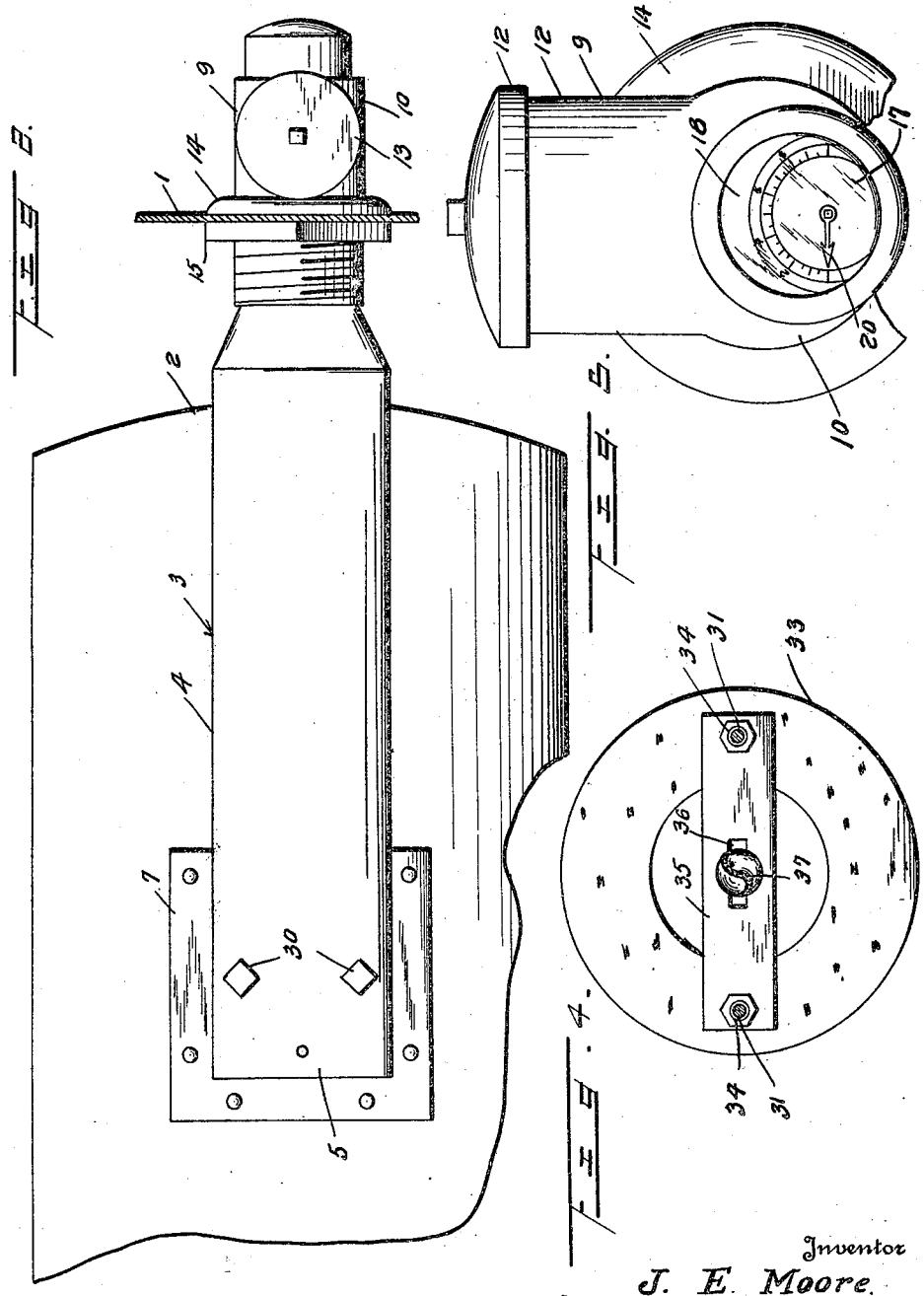
Inventor
J. E. Moore.

Patented June 17, 1924.

1,498,474

UNITED STATES PATENT OFFICE.

JAMES E. MOORE, OF PROVO, UTAH.

GASOLINE-TANK FILLER.

Application filed January 5, 1921. Serial No. 435,290.

*To all whom it may concern:*

Be it known that I, JAMES E. MOORE, a citizen of the United States, residing at Provo, in the county of Utah and State of Utah, have invented certain new and useful Improvements in Gasoline-Tank Fillers; and I do hereby declare the following to be a full, clear, and exact description of the invention, such as will enable others skilled in the art to which it appertains to make and use the same.

This invention relates to new and useful improvements in gasoline tank fillers and has for its primary object the provision of means for facilitating the filling of a fuel tank of an automobile when the same is located within the body or under the seat by eliminating the necessity of removing parts of the automobile and requiring the occupants to move in order to expose the tank for filling.

Another object of this invention is the provision of a fuel receiving and conveying device adapted to be attached to a tank and extend through the body of the automobile so that fuel may be readily dispensed or poured into said tank from a point exteriorly of the body of the automobile.

A further object of this invention is the provision of an indicating means carried by the device so that a person may at a glance determine the quantity of fuel in the tank without having to expose the tank or remove parts of the automobile which conceal the same.

A still further object of this invention is the provision of a gasoline tank filler of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a sectional view illustrating my invention applied to a fuel tank and the body of an automobile, Figure 2 is a top plan view illustrating the device, Figure 3 is a plan view of a supporting plate, Figure 4 is a sectional view taken on the line 4—4 of Figure 1, Figure 5 is a front elevation illustrating the filler, and the indicator carried thereby.

Referring in detail to the drawings, the numeral 1 indicates the body of an automobile which has located therein a fuel tank 2 and the latter is usually located under the front seat of the automobile body when carried within the body, making it necessary to lift the front seat in order to fill the tank or measure the amount of fuel therein, consequently compelling the occupants of the front seat to move. In order to overcome this objection and to facilitate the filling of the tank, I have provided an attachment 3 consisting of a pipe 4 which has formed on one end a discharge head 5 adapted to overlie the opening 6 in the tank 2 and said discharge head is provided with flanges 7 that are bolted or otherwise secured to the wall of the tank 2 for the purpose of firmly securing the attachment to the tank. The pipe 4 projects laterally of one end of the tank 2 and has its free end enlarged and screw threaded as illustrated at 8 for detachable connection with a filling head 9. The filling head 9 is of substantially L-shape and has its horizontal portion 10 threaded onto the enlarged end 8 of the pipe 4 and also extends through an opening 11 in the body 1 of the automobile so that said filling head 9 is located upon the exterior of the body so that fuel may be readily poured or dispensed therein and conveyed into the tank by way of the pipe 4. The vertical portion 12 of the head 9 is provided with a removable cap 13 for preventing dirt and other foreign matter from entering the filling head. A shoulder 14 is formed on the horizontal portion 10 of the head 9 and abuts the outer face of the body 1 while a nut 15 is threaded to the horizontal portion 10 and bears against the inner face of the body 1 so as to firmly secure the filling head 9 to the body of the automobile, as well as the outer end of the pipe 4.

The front wall of the head 9 is provided with an opening 16 in which is located a dial 17 and the latter is protected by a transparent panel 18. A leak-proof connection is provided between the dial 17 and panel 18 and the head 9 and an indicator 20 is adapted to move over the dial for the purpose of indicating the number of gallons of fuel within the tank, and is mounted on the shaft 21 which is in turn detachably connected to a shaft 22 by a coupling 23. The shaft 22 is journaled in a suitable bearing 24 located within the tube 4. The shaft 22 extends to a point over the opening 6 of the tank and is supported by a bearing 26. The bearing 26 is provided with a suitable bushing 27 held in place by a set screw 28 and said bearing 26 is supported by a plate 29. The plate 29 is supported within the tank 2 directly under the opening 6 by means of bolts 30 carried by the pipe 4. Guide rods 31 are secured to the plate 29 and depend downwardly in the tank 2 and have their lower ends connected by a bottom plate 32. An annular float 33 is provided with openings in which are located bushings 34 and the latter are slidably mounted on the guide rods 31. A plate 35 is secured to the bushings 34 and extend across the top of the float and is provided with a slot 36 to receive a spiral shaft 37. The lower end of the spiral shaft 37 is journaled in the bottom plate 32 and the upper end of said shaft is journaled in the top plate 29, and has secured to its upper end a bevel pinion 38 which meshes with a bevel pinion 39 secured to the inner end of the shaft 22 whereby upon the movement of the float on the guide rods, a rotary movement will be transmitted to the shaft 22 by the spiral shaft 37 and consequently operate the indicator 20 over the dial to indicate the number of gallons of fuel within the tank.

While I have shown and described the preferred embodiment of my invention, it will be understood that minor changes in construction, combination, and arrangement of parts may be made without departing from the spirit and scope of the invention as claimed.

Having thus described my invention what I claim is:

In combination, a motor vehicle fuel tank located within and extending transversely of a vehicle and having an opening in its upper side, a filling pipe extending longitudinally above the tank and having its inner end attached to the tank and communicating with said opening, the outer end of the pipe terminating beyond one end wall of the tank and short of the adjacent side wall of the vehicle body, a hollow head having a portion passing through said side wall and receiving and having screw threaded engagement with the outer end of said pipe, a flange on said head and engaging the outer surface of said side wall, a nut threaded on said portion of the head and clamping the side wall between itself and the flange, whereby to prevent the head from having any movement relative to said pipe and said side wall, and said head having a filling opening in its upper side and a closure for said opening.

In testimony whereof I affix my signature in presence of two witnesses.

JAMES E. MOORE.

Witnesses:
 BIRDIE SNYDER,
 WILFORD S. GRAY.